United States Patent [19]
Niklason

[11] Patent Number: 6,129,624
[45] Date of Patent: Oct. 10, 2000

[54] METHOD AND APPARATUS FOR PREPARATION OF FISH FOR MINCED MUSCLE PRODUCTS AND SURIMI

[76] Inventor: Peter Niklason, 6759 21st Ave. NW., Seattle, Wash. 98117

[21] Appl. No.: 09/354,625

[22] Filed: Jul. 16, 1999

[51] Int. Cl.[7] .................................................... A22B 5/18
[52] U.S. Cl. .............................. 452/106; 452/161; 83/857
[58] Field of Search ..................................... 452/106, 109, 452/161, 116, 35; 83/857

[56] References Cited

U.S. PATENT DOCUMENTS

| | | |
|---|---|---|
| 2,051,256 | 8/1936 | Hilke . |
| 2,976,752 | 3/1961 | Duba . |
| 3,074,446 | 1/1963 | Earl . |
| 3,361,173 | 1/1968 | Lamb . |
| 3,596,308 | 8/1971 | Kenney ..................................... 452/125 |
| 3,804,964 | 4/1974 | Hogstedt et al. . |
| 4,082,024 | 4/1978 | Hodges et al. . |
| 4,213,360 | 7/1980 | Hartmann . |
| 4,372,184 | 2/1983 | Fisher et al. . |
| 4,423,652 | 1/1984 | Winslow . |
| 4,614,141 | 9/1986 | Mendenhall et al. . |
| 4,807,503 | 2/1989 | Mendenhall . |
| 5,009,141 | 4/1991 | Julian et al. ............................... 83/857 |
| 5,046,388 | 9/1991 | Mendenhall . |
| 5,167,177 | 12/1992 | Cimperman et al. . |
| 5,554,069 | 9/1996 | Burch . |
| 5,568,755 | 10/1996 | Mendenhall . |
| 5,759,095 | 6/1998 | De Weerd ............................... 452/106 |
| 6,068,036 | 5/2000 | Carollo ..................................... 452/35 |

FOREIGN PATENT DOCUMENTS

| | | | |
|---|---|---|---|
| 1436859 | 3/1966 | France ................................... 452/161 |

OTHER PUBLICATIONS

Author unknown, "Toyo–167NM For Mackeral Pike, Sardine, and Small Horse Mackeral", Toyo Suisan Kikai Co., Ltd., Osaka, Japan.

Author unknown, "Alaska Pollack Processing Machine", Toyo Suisan Kikai Co., Ltd., Osaka, Japan.

*Primary Examiner*—Willis Little
*Attorney, Agent, or Firm*—Richardson & Folise

[57] ABSTRACT

A method and apparatus which utilizes a hydraulic fluid such as water or air to propel fish through cutting blades which strip cut the fish so that exposed viscera of the fish may be removed by brushes or the like. Fish are processed serially in appropriately sized and shaped conduits at high speeds.

25 Claims, 9 Drawing Sheets

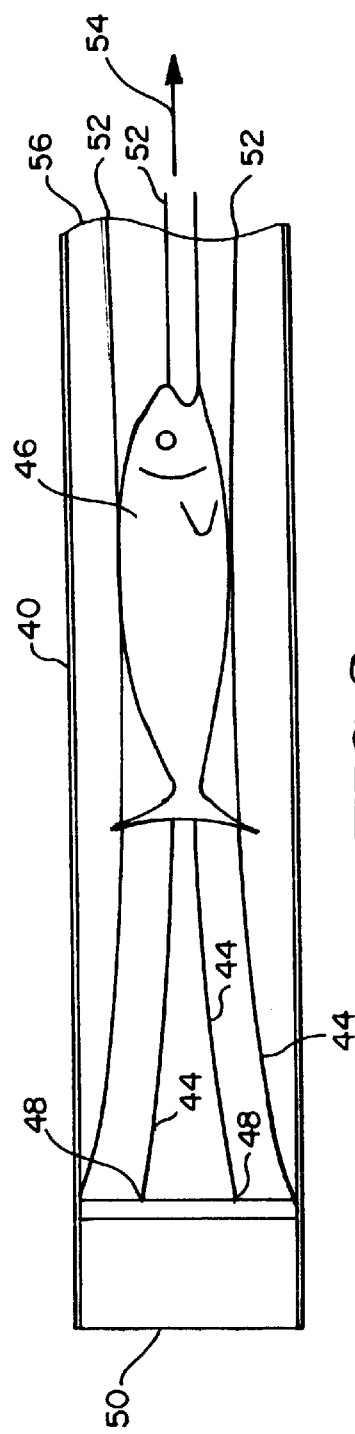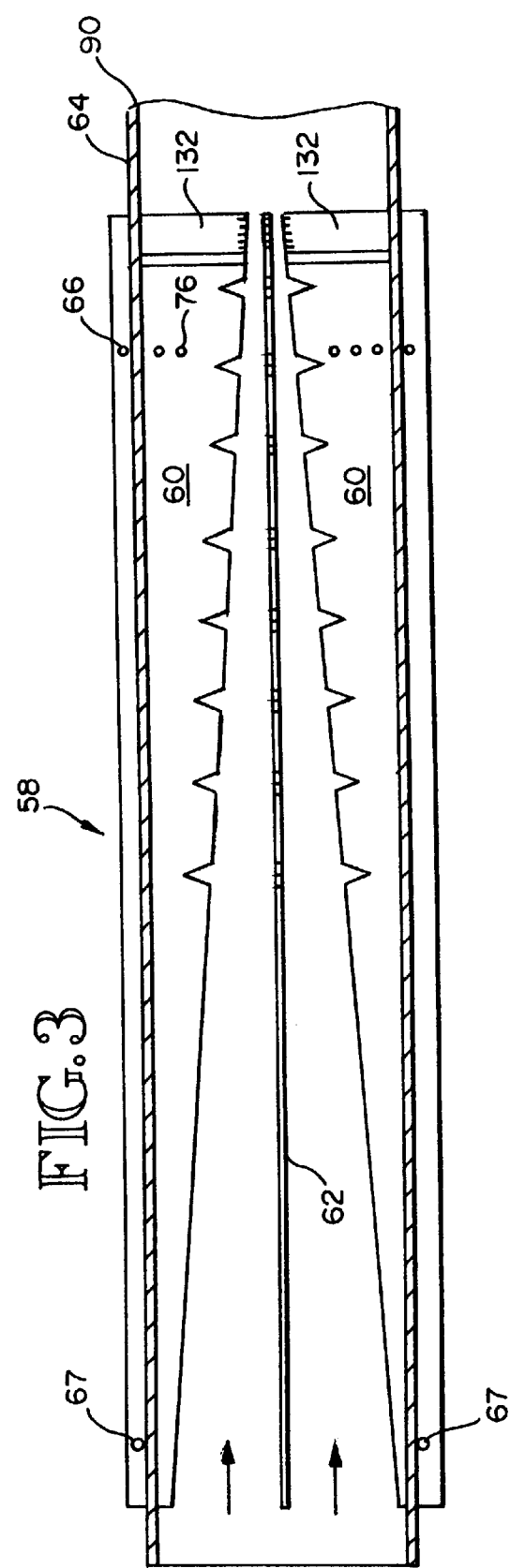

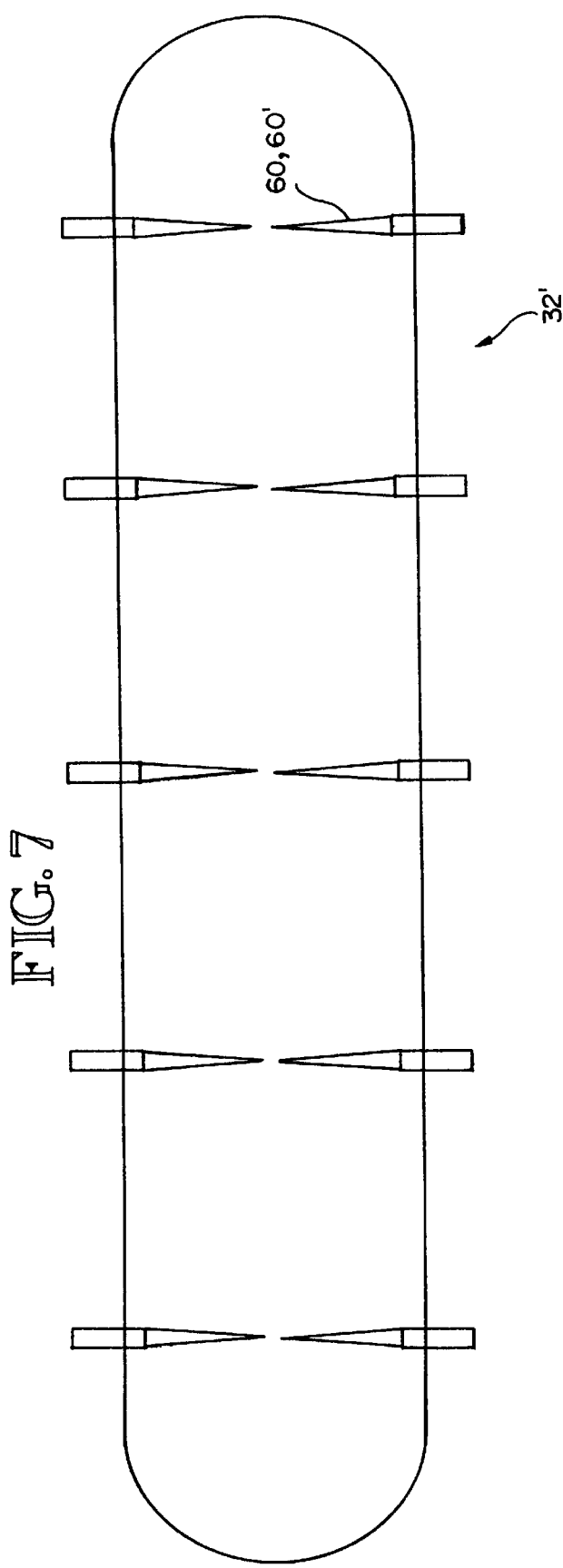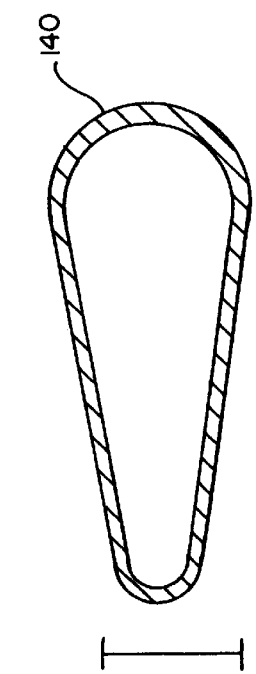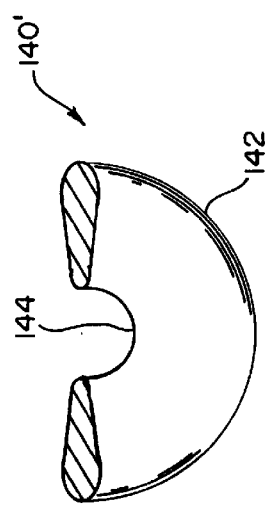

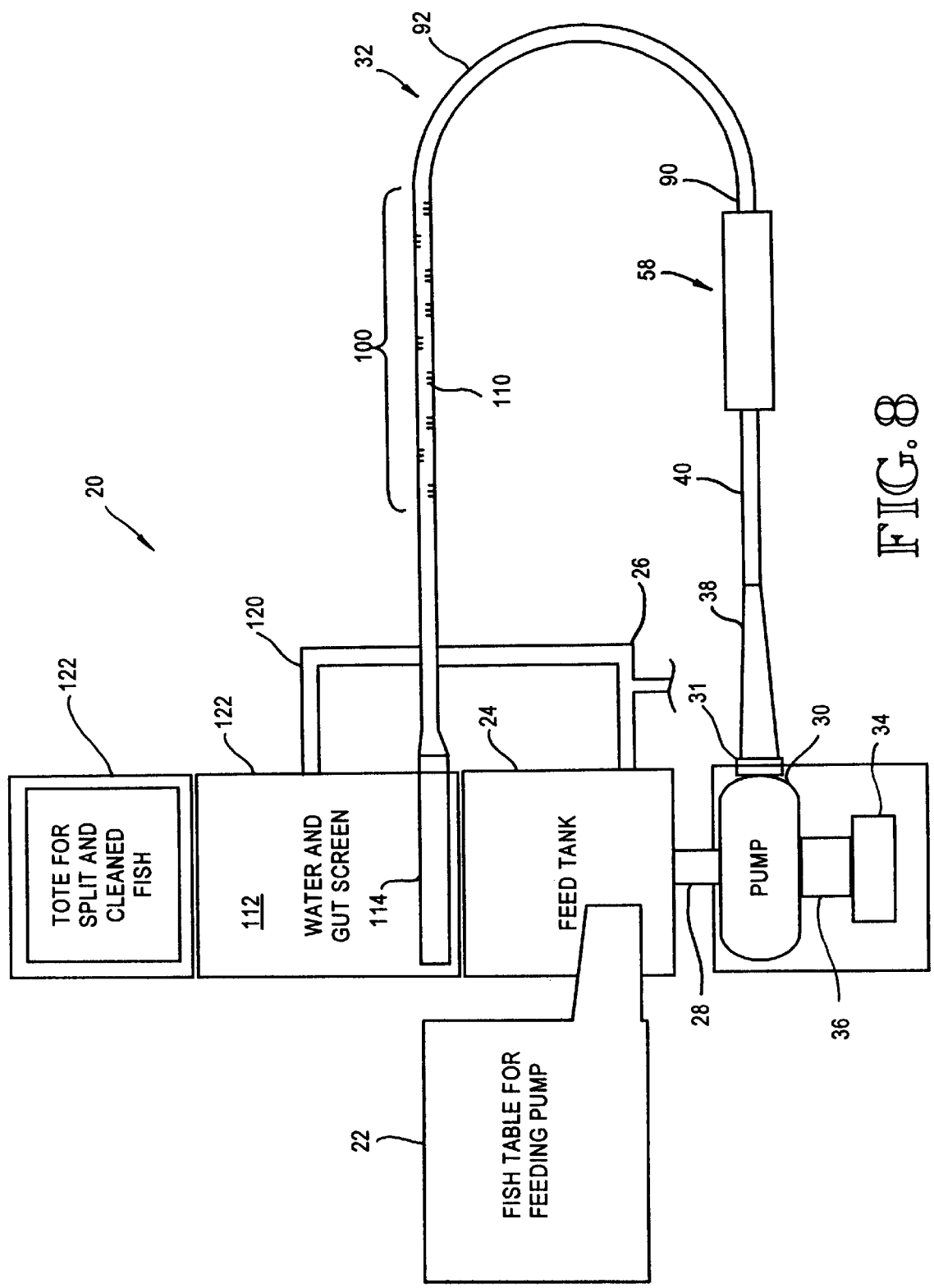

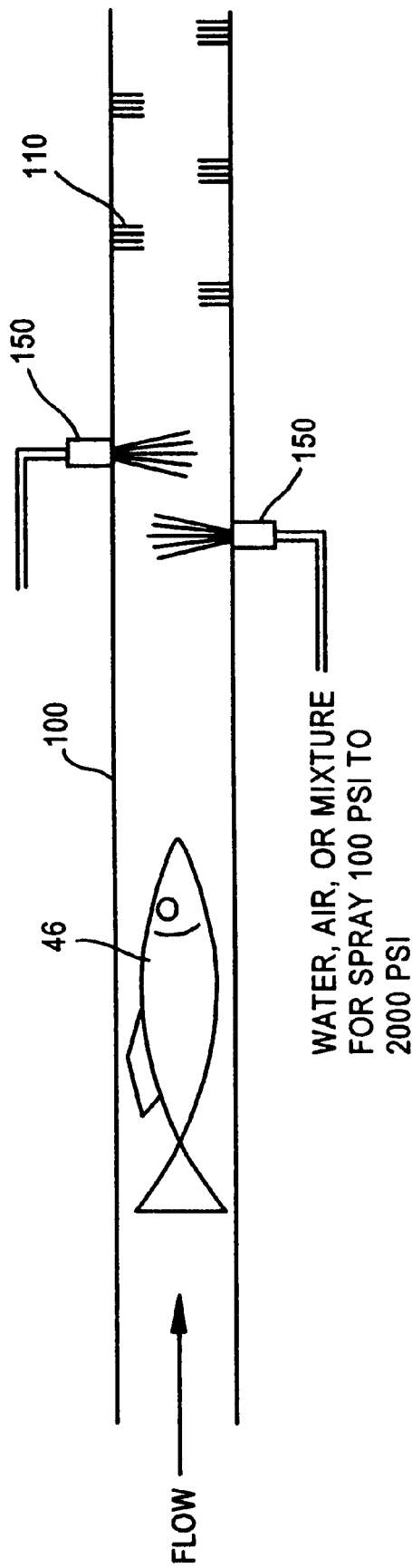

METHOD AND APPARATUS FOR PREPARATION OF FISH FOR MINCED MUSCLE PRODUCTS AND SURIMI

TECHNICAL FIELD OF THE INVENTION

This invention relates to methods and apparatus for the production of split and eviscerated fish. The fish can then be further processed to minced meat and/or surimi.

BACKGROUND OF THE INVENTION

Automated apparatus for eviscerating large bodied fish have been available for some time. One example of such apparatus is disclosed in U.S. Pat. No. 5,554,069, "Apparatus and Method for Subdividing a Fish into Loin-Containing Portion and Viscera-Containing Portion" to Burch et al. The apparatus disclosed therein comprises a conveyor upon which a large-bodied fish, such as a tuna fish, is carried with its belly portion pointing upwardly. Two rotating blades arranged in a "V" configuration slice through the belly portion of the fish in a pair of angled, intersecting cuts to substantially remove the viscera-containing portion of the fish from the loin-containing portion. This apparatus is not suitable for processing smaller bodied fish or batch processing fish having different sizes.

Smaller fish, such as pollock, while comprising a substantial portion of the total quantity of ocean fish caught have traditionally been considered a waste product and are often thrown back into the ocean. The recent decline in fish populations have rendered smaller fish, such a pollock, more valuable. However, satisfactory apparatus and methods are currently unavailable for processing pollock and other small fish in a cost-effective manner. U.S. Pat. No. 3,804,964 to Hogstedt et al. entitled "Method and Apparatus for Treating Fish" describes a method for processing small fish incorporating steps of soaking and agitating pre-cut fish portions in large vats of water from between 15 to 120 minutes, with an optimum time of about 60 minutes, to separate the fish protein from viscera and other undesirable portions of the fish. Such a process, however, is not commercially acceptable for the production of high quality minced fish muscle products and surimi and is therefore not a viable process for processing pollock and other small bodied fish.

Beginning Jan. 1, 1998 the North Pacific Fisheries Management Council (hereinafter "NPFMC") required that all harvested pollock be retained and utilized. This is a problem in the pollock fishery where small fish are often unavoidable and represent over 25% of landed weight in some situations. Additionally, in all world fisheries small fish and flatfish are often not used for human consumption due to low yield, high labor costs, and high equipment costs. The term "small fish" as used herein means fish that are 15 cm to 40 cm in length (6 inches to 16 inches) and weigh from 80 grams to 500 grams (0.18 lb. to 1.10 lb.).

There are currently five options to retain and utilize small pollock and other fish species. These five options are described below along with their economic limitations.

1) Fishmeal—Putting whole fish in the meal process undesirably takes capacity away from processing offal and complicates raw material handling for processors. If the fish meal plant capacity is maximized due to small fish, the processor must limit production of more valuable primary food products and lose potential revenue during limited fishing periods. If the fish have been bought from a catcher boat, then loss is estimated to occur if the cost of pay fish sent to meal exceeds 2.5 cents per pound. This is based on seven metric tons of fish to produce one metric ton of meal and a production and handling cost of $100.00 per ton of finished meal. Calculating using the above information gives a cost of meal as $485.00/metric ton. Finally, recovery of muscle food products from whole fish have a much higher value than fish meal.

2) Conventional filleting machines—Toyo Sulsan Kikai Co., Ltd., Osaka, Japan, and others manufacture filleting machines which are used almost exclusively for processing pollock. The economic limitations for small fish processed with these machines are yield, speed, labor, machine cost, equipment space, and quality. Each of these factors are discussed below.

Yield—These machines, in general, were not designed to process small fish in the six to sixteen inch range. Small fish do not align properly in the machine, if at all, and the cutting blades remove too much meat from smaller fish. This results in muscle recovery, as percentage of round fish weight, that is significantly lower than larger fish for which the machines were designed.

Speed—The Toyo filleting machines can run up to 280 fish per minute. Very good performance over a twelve hour shift for these machines would be an average of 210 fish per minute. These speeds would be very difficult for top operators to achieve when working with small fish. The reduced speed combined with poor yields place an economic burden on producers in addition to wasting a food resource.

Labor—Two or three operators are needed to operate each filleting machine. This is a significant cost for operating a machine that is inefficiently cutting fish for which it was not designed.

Machine cost—The cost to install one complete filleting machine line is in the $250,000.00 to $500,000.00 range. Parts and labor to maintain these specialized machines also make performance and output extremely important.

Equipment space—Conventional filleting equipment and lines require valuable production space for equipment, operators, material feed conveyors, and waste handling. Additionally, this equipment is permanent and cannot be moved without a major overhaul of the processing facility and processing lines. These space costs and inflexibility become increasingly important when the fish size is below where conventional equipment can operate efficiently.

Quality—As stated above, conventional Toyo and other machines were not designed to handle fish in the six to sixteen inch range. The first problem occurs at the head cut. For some filleting machines there is a measuring and pushing device to maximize the position of the head cut near the gill plate. This system is operating below machine design and is marginally effective depending on the skill of the operator and the talent of the staff service mechanic. The Toyo filleting machines have rotary brushes that push fish forward to a head bar before the heads are cut off. Smaller fish headed in a Toyo machine seldom have the cut near the gill plate to maximize quality and recovery. The fish are often nearly cut in half with the high volume and quality dorsal and nape meat severed with the head. The next problem is the "grip" belts that convey headed fish through the splitting and filleting section of the fillet machines. Small fish do not align properly and are not held tightly enough to maximize the precision cutting of the filleting and boning knives. There is also a high dropout rate where small fish fall out of the "grip" belts and into the offal stream resulting in reduced recovery. Small improperly headed fish tend to roll when dropping into the "grip" belts from the fillet machine heading section. Fish that are not aligned with the bellies straight down are much less likely to be completely eviscerated and have the body cavity brushed and rinsed. The result is fish fillets with varying amounts of attached viscera and black belly cavity membrane. Minced meat quality produced from these fillets is lowered by proteolytic enzymes and bacteria from viscera. Black belly membrane lowers minced meat quality with visible "black spot" impurity in the white minced flesh. Low quality minced meat reduces recovery and grade quality in the surimi process.

3) Low grade products—The third option for retention and utilization of small fish is production of minces, headed and gutted fish, or whole frozen fish. These products satisfy the retention and utilization requirements but produce low value products that compete with production and storage resources that are needed for higher profit producing products. This approach is a step towards utilization of the fish resource but still does not solve the problem of good economic use of small fish.

4) Small fish filleting machines—The fourth option is using small fish filleting machines. Adapting herring or pilchard filleting machines is a possibility. The option that is being pursued by some processors is the use of the Toyo 167 model that is made specifically for small pollock. The cost for this machine is $110,000.00 excluding installation, conveying equipment, and plant modification to integrate this machine. Two skilled operators are required to reach an average target speed of 180 fish to 200 fish per minute. This option solves the efficiency problems of processing small fish in conventional filleting machines, but still has the overhead of high cost, space limitations, inflexibility, and speed.

5) At sea dumping—In unregulated fisheries many tons of small fish and flatfish are dumped back in the ocean as waste. This is due to lack of an economic process to handle these fish. It is well documented that shrimp trawlers catch five to ten times more fish than shrimp. The by-catch from shrimp trawling is then dumped at sea. Obviously, this option is economically and ecologically unsound.

Thus, there is a need for a process that can economically recover fish muscle for human consumption from smaller sized fish. Requirements are high speed to produce sufficient volume of material from small fish, low capital cost and maintenance, low labor and operating cost, and high yield.

SUMMARY OF THE INVENTION

It is therefore an object of the present invention to provide a method and apparatus for automatically eviscerating fish at high speed with minimum manual labor.

It is a further object of the invention to achieve the above object in an apparatus which can process fish of varying size without requiring reconfiguration of the apparatus.

It is yet another object of the invention to achieve the above objects with an apparatus that is inexpensive to manufacture and utilizes a method which is environmentally sound.

The invention achieves these objects, and other objects and advantages which will become apparent from the description which follows, by employing a hydrodynamic partial decortication process, including the steps of propelling a quantity of fish through a conduit by a hydraulic apparatus, longitudinally aligning and centering the fish in series in the conduit, and strip-flaying the fish in the conduit with a plurality of cutting blades to expose viscera of the fish, and eviscerating the flayed fish by snagging the exposed viscera from the flayed fish in the conduit and entraining the viscera in a hydraulic flow separate from the flayed fish. As used herein, the term "hydraulic" encompasses the generally understood meaning of an incompressible fluid, such as water. However, the term "hydraulic" as used herein can also encompass the use of a compressible gas, such as air, for transporting the fish and providing kinetic energy to the fish.

The inventive apparatus used to accomplish the above method can include a hydraulic pump or gravity feed system for propelling the fish in a hydraulic flow in a guide conduit. A hydraulic cutting conduit, having an inlet connected to the guide conduit, has a plurality of elongated, longitudinally-oriented blades having free ends inwardly biased and protruding into the hydraulic flow so that fish passing through the cutting section are strip-flayed to expose viscera of the fish. An eviscerating conduit having an inlet connected to the cutting conduit has a plurality of inwardly directed projections, such as brushes, for snagging the exposed viscera from the flayed fishes and for entraining the viscera in the hydraulic flow substantially separately from the flayed fish.

In a preferred embodiment, the present invention uses water flow and pressure in an enclosed conduit to provide the conveying power for fish through alignment guides, knives, and brushes that are located in the conduit. The velocity and momentum of the fish and water in the conduit provide the power to force the fish through the alignment guides, knives, and brushes that are mounted in the conduit. Using different fittings and pipe configurations and sizes causes changes in the amount of turbulence in the flow that enhances fish washing and separation of viscera and unwanted material. The advantage of using water as the conveying power is the elimination of many mechanical moving parts that add cost to conventional machines and limit material through-put. The fish and water mixture that is discharged from the conduit contains a mixture of water, split fish, viscera, and fish pieces. This mixture can be screened where the spent water containing the unwanted viscera is separated from the split and eviscerated fish.

The shape and size of the pipe or conduit can be varied to accommodate the fish species being processed. The amount and size of alignment guides, knives, and brushes can also be varied depending on the species processed and desired results.

An analogy of the process is blowing a pea through a straw. By using an incompressible fluid such as water there is very efficient transfer of energy from the moving column of fluid to be applied to conveying the fish through the splitting knives and cleaning brushes. The flow of water and water to fish ratio can be varied according to fish species, size, condition, and desired results.

The goal of the process is to split the fish and remove the viscera. Removal of the head is not a goal of this process. However, the head is subject to being split and portions such as the jaw, gills, eyes, and gill plates may be partially or wholly removed in the process. By not removing the head the large mass of muscle directly behind the head is not lost as is the case when the head is removed. The meat associated with the backbone and ribs is also retained versus removal during conventional automated filleting. The result is that all edible muscle remains attached to the split and eviscerated fish. This greatly increases the yield compared to conventional processing. In some processing situations fish are headed or headed and gutted to recover high value roe. Fish that have been headed, gutted, or headed and gutted can also be used in this process.

BRIEF DESCRIPTION OF THE DRAWINGS

FIG. 2 is a schematic representation of a guide conduit of the present invention having a fish therein.

FIG. 3 is a sectional, side-elevational view of the cutting section shown in FIG. 1.

FIG. 7 is a second alternate embodiment of the cutting section shown in FIG. 1 for use with flat fish, such as flounder.

FIG. 7a is a cross-sectional schematic representation of a first embodiment of a turning section of the present invention.

FIG. 7b is a top plan, schematic representation of a second embodiment of a turning section of the invention.

FIG. 8 is a schematic, top plan environmental view of the invention.

FIG. 11 is a schematic representation of an alternate embodiment of the invention shown in FIG. 10.

DETAILED DESCRIPTION OF THE PREFERRED EMBODIMENTS

Figure 1:
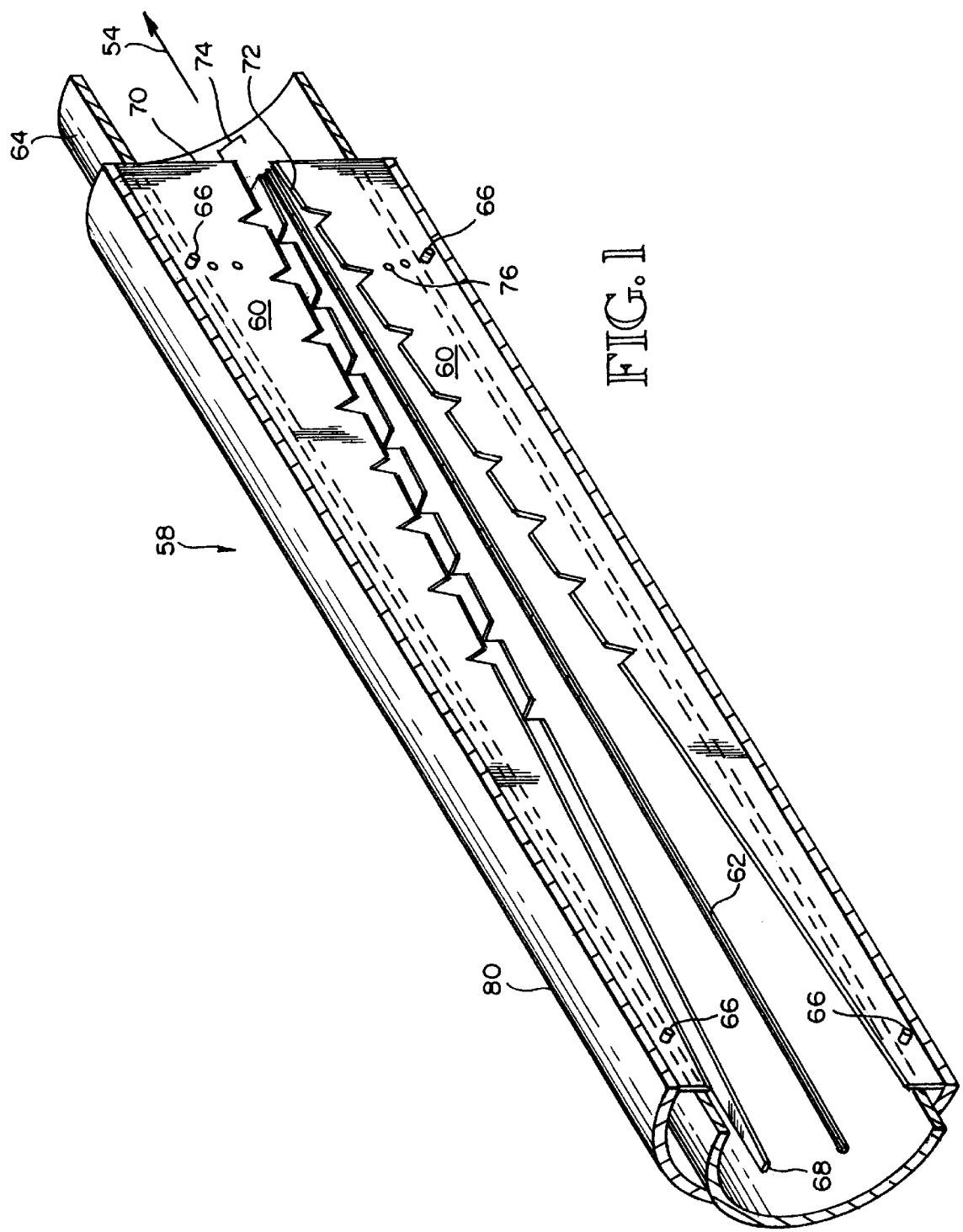
FIG. 1 is a partial, environmental view of a cutting section of the present invention.

A hydrodynamic partial decortication apparatus for eviscerating fish is schematically represented in top plan view at reference numeral 20 in FIG. 8. The apparatus 20 is a preferred embodiment of the invention for processing pollock having a size of approximately 15 centimeters to 40 centimeters (six inches to 16 inches) in length, and weighing from 80 grams to 500 grams (0.18 lbs. to 1.10 lbs.). As will be well understood by those of ordinary skill in the art upon reviewing this disclosure, the apparatus can be scaled appropriately to process larger fish or fish having an unusual shape or size. The apparatus 20 can process whole or headed fish, and utilizes hydrodynamic forces to serially propel fish through a conduit appropriately sized for the largest fish to be processed. The apparatus strip cuts the fish so as to expose the viscera, and has means for removing the viscera from the flayed fish, and for entraining the viscera in the hydraulic flow. As used herein, the term "hydraulic" includes a flow of incompressible fluid, such as water, as well as a flow of compressible gas, such as air.

As shown in FIG. 8, the apparatus 20 includes an input such as table 22 for receiving whole or headed fish. The fish are moved from the table 22 by an operator (not shown) into a feed tank 24 which in the preferred embodiment is full of water. Water is introduced into the feed tank 24 through a water inlet 26 such that the volumetric ratio of fish to water is approximately at least one part fish to ten parts water. The feed tank 24 has an outlet 28 fluidly connected to a pump 30 for propelling the fish/water mixture into a conduit generally indicated at reference numeral 32 in FIG. 8. The conduit 32 has diameter of approximately 2.5 inches and a length of approximately 57 feet. An appropriate pump is a model 8NHPP manufactured by Cornell Pump, Portland, Oreg. The pump 30 is powered by a 15 h.p., 1200 r.p.m. electric motor 34 through a transmission 36. The pump is fluidly connected to the conduit 32 by a tapered accelerator section 38 manufactured from stainless steel and having an input diameter of approximately 8 inches, an output diameter of approximately 4 inches, and a length of approximately 4 feet. The accelerator section accelerates the fish in the conduit 32 to a rate of approximately five fish per second at an estimated flow rate of approximately 250 to 400 gallons per minute.

The conduit 32 further has a hydraulic guide conduit section 40, seen in greater detail in FIG. 2. The guide conduit section has a plurality of elongated guide rods 44 to center the fish 46 in the hydraulic flow defined by the conduit 32. Fixed ends 48 of the guide rods are connected to the sidewall of the guide conduit section 40 such as by bolts or welding (not shown) adjacent to an inlet end 50 of the guide conduit. Free ends 52 of the rods project along a longitudinal axis 54 defined by the guide conduit 40 and the direction of the fluid flow such that the main body of the rods are substantially parallel to both the conduit section and the direction of fluid flow. An outlet end 56 of the guide conduit 40 is connected to a hydraulic cutting conduit 58 shown in sectional view in FIGS. 1 and 3. The cutting section includes a plurality of elongated, triangular cutting blades 60 residing in elongated slots 62 in an inner conduit 64. Transverse pins 66 prevent the blades 60 from falling into the conduit. The blades 60 are substantially tapered from an inlet end 68 to an outlet end 70 such that serrated cutting surfaces 72 of the blades 60 are separated by a minimum gap distance 74 of approximately 2 to 3 millimeters at the outlet end. The blades 60 can be inwardly biased by circumferential elastic bands (not shown) such that the blades 60 can move radially outwardly as fish pass through the cutting conduit 60 in the direction of the hydraulic flow 54. The gap 74 is critical to the present invention in that it prevents the fish from being fully cut through. The gap size is preferably selected so that the abdominal cavity, head, etc., of the fish are sliced open to reveal the underlying viscera without completely cutting through the fish. The size of the gap may be adjusted by positioning the pins 66 in any one of a variety of apertures 76 in the blades 60, as best seen in FIG. 3. Alternatively, set screws (not shown) may be positioned in threaded bores (not shown) in the pins 66 to set the maximum depth of the blades into the conduit 32.

In order to maintain hydraulic pressure in the conduit 32, an enlarged, coaxial casing 80 surrounds the blades 60 and is sealed by end caps 82 with respect to the inner conduit 64. The inner conduit 64, coaxial casing 80 and blades 60 are preferably manufactured from stainless steel for strength and durability.

Figure 4:
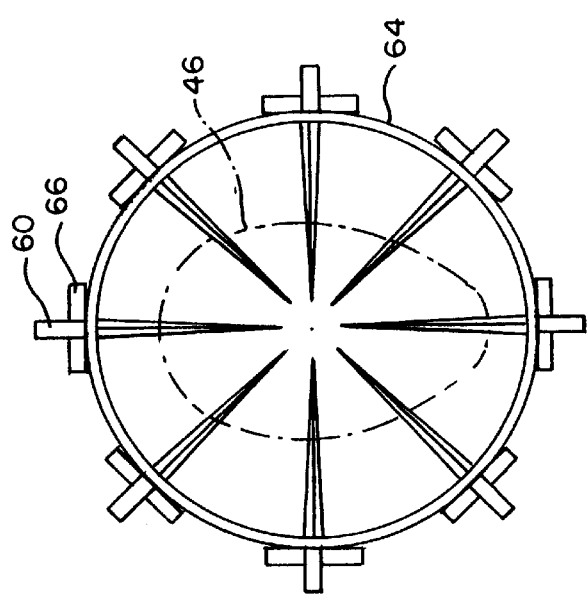
FIG. 4 is an end view of the cutting section shown in FIGS. 1 and 3.

FIG. 4 illustrates an end view of the cutting section shown in FIGS. 1 and 3 wherein eight radially directed, angularly spaced blades are provided so that the gut cavity of the fish 46 will be cut into regardless of the angular orientation of the fish 46 within the conduit 64.

Figure 5:
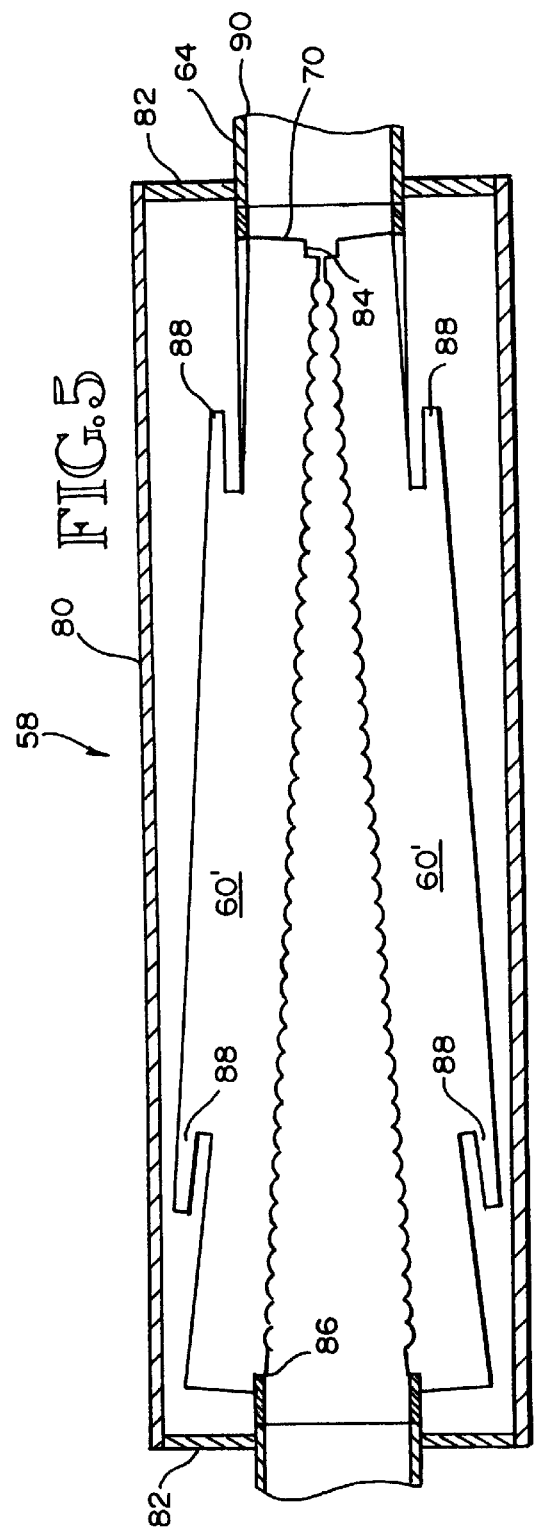
FIG. 5 is an alternate embodiment of the cutting section shown in FIGS. 1, 3 and 4.

FIG. 5 illustrates an alternate embodiment of the cutting blades 60 shown in FIG. 1 at reference numeral 60'. In this embodiment, the blades are substantially rectangular in plan view, rather than triangular, so that the blades may be reversed in the cutting section for longer life. To this end, each blade has a notched edge 84 for use as a journal against an edge 86 of the slot 62 in which the blade resides. Inwardly from this notch and on an upper surface of the blade, projections 88 are provided to functionally replace the pins 66 of the embodiment shown in FIGS. 1 and 3. The projections prevent the downstream end of the blades 60' from falling into the inner conduit 64. Circumferential bands (not shown) maintain an inward bias on the outlet ends 70 of each blade.

An outlet 90 of the cutting section 58 may be connected to a curved conduit 92 to reduce the overall length of the apparatus 20, as shown in FIG. 8.

Once leaving the cutting section 58, and curved conduit 92, the fish enter into an eviscerating conduit 100 having a diameter of approximately 2.5 inches and a length of approximately 5 feet. The length and diameter of this conduit may be varied to provide more or less eviscerating action. The conduit is provided with a plurality of nylon bristles 110 having a length of approximately 1.5 inches. The bristles are randomly spaced in the conduit, and in at least one experiment a density of approximately 25 bristles per linear foot has been found sufficient to separate the viscera from the flayed fish bodies and to entrain the viscera in the fluid flow separate from the flayed fish bodies. The density, stiffness and length of the bristles may be adjusted by those of ordinary skill in the art appropriately for different species of fish and for fish having varying degrees of freshness. The resulting outflow of the eviscerating section 100 is directed to an inclined water and gut screen 112 best seen in FIG. 8 through an outlet pipe 114 which distributes the resulting flow over the entire width of the screen. The screen preferably has a mesh size of approximately 1 inch. The viscera falls through the screen into a tank beneath the screen (not shown) along with almost all of the water discharged from the outlet pipe 114. The viscera is filtered out from this water in the conventional manner, and the water is pumped through a return flow conduit 120 into the feed tank 24. The eviscerated fish roll down the screen 112 under the influence of gravity into a container 122 for further processing as fish mince meat, surimi, or the like.

Figure 9:
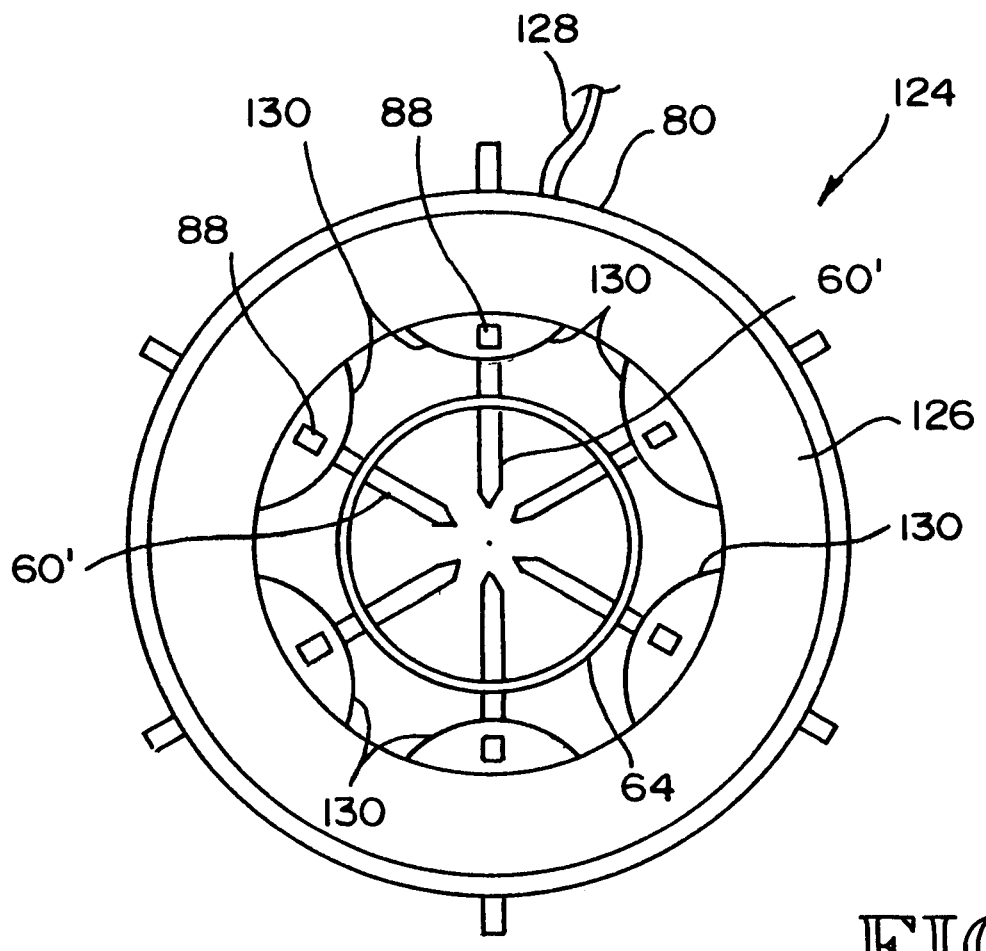
FIG. 9 is an elevational view of a pneumatic mechanism for raising and lowering the blades of the cutting section.

FIG. 9 illustrates an alternate mechanism for inwardly biasing the blades 60 the 60' of the preferred and alternate embodiments, respectively. The biasing device 124 is positioned between the coaxial casing 80 of the cutting section 58 and the inner conduit 64 thereof, adjacent to the outlet end caps 82. The device has a pneumatic tube or torus 126 which can be inflated or deflated through a pneumatic tube 128. The torus has a plurality of wire loops 130 connected thereto for capturing the projections 88 on the alternate embodiment of the cutting blades 60', or the transfer pins 66 of the preferred embodiment of the cutting blades 60. Inflation of the torus 126 urges the blades 60 or 60' inwardly. Conversely, deflation of the torus causes the wire loops 130 to urge the blades in a radially outward direction thereby permitting the inner conduit 64 to be cleared of obstructions, jammed fish, etc.

An important feature of this process design is the fish can be oriented head first or tail first in the flow. As described above fish and water mixture are pumped using commercially available pumps (such as pump 30) that are designed to handle fish and vegetables. The diameter and length of the conduit 32 is set to adjust the flow to match the rate of material to be processed. Reducing the diameter or hydraulic radius of the conduit in the various sections containing the alignment guides 44, knives 60, 60', and cleaning brushes 100 has two functions. Primarily, the fish 46 are accelerated to highest velocity to maximize the momentum and power of the hydraulic fluid when passing through in-line fittings such as alignment guides, knives, and brushes. Reducing the conduit size also decreases the space between the fish and the conduit wall and lessens the amount of lateral movement of the fish. This results in better alignment of the fish with the fluid flow 54. After the cutting and cleaning sections 58, 100 the conduit 32 can be varied in length and diameter to adjust the fluid pressure and thus flow velocity. The loss of fluid pressure and flow due to gravity is small. This allows the conduit to be routed in any direction and provides greater flexibility in the physical space required for this process. The water and processed fish mixture that is discharged from the conduit at outlet pipe 114 is screened to separate the fish solids from the water stream. Recovered water can be recycled back to the process if needed, such as through return flow conduit 120.

The purpose of the alignment guides 44 is to center fish 46 in the conduit. The aligned fish enter directly into the cutting section 58 containing the knives or blades 60, 60'. Alignment and centering the fish in the flowing fluid allows the knives to evenly cut the fish to desired depth. The thin rods 44 are anchored to the conduit 40 and project down stream at an angle toward the center of the conduit. The length of the alignment rods can range from 1.0 times the diameter of the conduit to 25 times the diameter of the conduit. Material and size of the alignment rods is based on the tensile modulus of the rod. The number of alignment rods can range from four to forty depending on the processing situation. An example of rods used in pilot studies is twelve ⅛ inch diameter stainless steel rods anchored equidistant in a circular conduit. The flexibility and bending of the rods decreases differentially from the anchored, or fixed end 48. This differential bending provides more force normal to the conduit wall at the entry point for fish and forces the fish towards the center of the conduit. As the fish travels further through the alignment rods there is more flex to the rods as the lever arm of the rod to its anchor point increases. The angle of the rods bring them closer together farther along the length. This evenly distributes the force around the fish and guides it toward the center of flow.

One to eight knives 60, 60' can be arranged to protrude into the flow in the cutting conduit or section 58. The maximum height of an individual knife blade 60, 60' from the conduit wall can range from 0.1 millimeters up to the diameter of the conduit. In noncircular conduits the maximum height of an individual knife blade can range from 0.1 millimeters to the maximum distance across the conduit cross section. Knives can be circular or tapered. However, in the preferred embodiments shown, the blades are separated by a minimum gap distance 84 as previously discussed.

FIG. 4 shows the cross section of a circular conduit 64 and eight knives 60 and a cross section of a fish 46 passing through the knives. By using eight knives in this embodiment at least two of knives will slice open the gut cavity of the fish and expose the viscera for removal and cleaning of the gut cavity. The head is also split helping in the removal of some non-edible portions such as gills, eyes, and bony structures. The number of knives, spacing, and height from conduit wall determine the amount and depth of splitting or strip cutting that is done.

In the arrangement illustrated in FIG. 4 the opposing pairs of knives 60, 60' are far enough apart that the fish is not cut through into separate strips. The thinnest portion of the fish near the tail will pass through the knives uncut. This produces a strip cut or flayed fish that is still held together by skin and muscle that is attached to bone and connective tissue. The result is a fish that has the belly cavity and head split open for cleaning but is still held together as one piece for easy separation at conduit discharge pipe 114.

An important aspect of the strip cutting is exposure of more muscle for recovery in a conventional deboning or mincing operation (not shown). In mince meat recovery fish meat is recovered by pressing fish fillets through 3 millimeter to 5 millimeter holes in a rotating drum using belt pressure. The muscle is pressed through the holes leaving skin and bones on the outside. If the skin-on side of a fillet is against the drum holes the meat cannot easily be pressed off, resulting in lower yield and quality. The strip cut fish have a much higher ratio of exposed meat to skin. This reduces the need for precise orientation in the mincing process to assure high yield and quality of minced fish flesh.

There are many possible combinations of knife designs and methods of attachment or operation. As shown in FIGS. 1 and 3, the knives are made from a triangular shaped piece of flat metal stock. To insert the knife into the conduit 64 a slot 62 is milled in the wall of the conduit that is slightly larger than the length and thickness of the back of the knife. Holes 76 in the back of the knife blade allow pins 66 to be inserted to prevent the blades from falling through the wall into the conduit. The location of the holes and pins also determines the depth setting of the knife into the conduit. To hold the knives in place a force needs to be applied against the back of the knives. This can be elastic bands, springs, pneumatic pressure, hydraulic pressure, or rigid bands.

One of the important features of the floating blade design is the ability to vary the amount and position of the force applied to the back of the knife. This allows the upstream retaining pins 66 to act as a pivot point and allow the down stream end of the knife to "float" up and down proportional to the fish cross section size passing through. The two primary points of applied force would be where the retaining pins 66 are located. Elastic bands or springs work well to hold the knives in place and also evenly distribute the force to the knives. Varying the force or tightness of the downstream end of the knives also determines the depth of cutting.

Other features that make the floating blade design unique are the ease of inserting and removing the knives or blades 60, 60'. Once tension is released at the retaining pin points 66, 67 the blades can be lifted out. The simple design reduces cost and simplifies the sharpening and maintenance of the knives. Wear is adjusted for by moving the retaining pin in the pin holes 76. Serration of knives shown in FIGS. 1 and 3 is an option depending on blade wear and the boniness of the fish.

Eviscerating spikes or rippers 132 as seen in FIG. 3 are features that protrude into the conduit 64 just after and in line with the knives 60. The purpose is to project into the freshly cut slit made by the knives and catch on or rip any loosened viscera, gills, jaw, gill plates, or head pieces. The maximum height of the spikes is equal to the maximum height of the knife blade 60 in relation to the conduit wall. These rippers can be a set height and anchored to the conduit wall or can be attached to the floating blades as shown so that they move up and down relative to the depth of cut by the blade. The spikes 132 can have different shapes and surface finishes to enhance the ability to snag material and start the separation process from the fish. One alternative design (not shown) is similar to a metal screw. The tapered shape of the screw projects into the cut in the fish to open it and start loosening material for removal by brushes and water. A feature such as the sharp spiral flight on a screw adds to the effect of snagging and ripping loose material. The effectiveness of ripping spikes is based on the classification of fish into three types of the material based on hardness. Hard non-uniform pieces from the sliced head will catch on jagged features and be torn away. Soft viscera will wrap around and be caught on jagged features and be loosened or torn away. Medium muscle material that is held together in a uniform mass by skin, bone and connective tissue will be less likely to snag and be separated from the main body of the fish.

An important feature of the invention process is the use of water to transfer power and convey the fish. If air is entrained in the conduit, the incompressible nature of the flowing column is lost. The air acts like a spring in the fluid and lowers the instantaneous transfer of energy and velocity to the fish. To prevent water leakage out, and air entrainment in, all leaks need to be sealed. This is most important in the knife section 58 where slots 62 have been cut through the conduit wall 64 to accommodate the blades 60, 60'. To accomplish this an efficient solution is a concentric cover 80 that fits over and seals the knife section. With minimal clearance to allow adequate movement of knives, the volume and size of the cover is reduced. In the case of round conduit or pipe another section of pipe can be placed over the knife section. The ends can be sealed in many different ways. Using concentric rings or end caps 82 and o-rings (not shown) is a simple seal solution that allows easy removal of the cover 80 for service.

After fish 46 have passed through the knives 60, 60' in the cutting section 58 brushes 100 may be required to clean and separate viscera and unwanted material from the fish. Mounting brushes in the conduit 32 or through the conduit wall and protruding into the flow stream provides abrasion to loosen unwanted material.

For fish with a round or ovate cross section, circular conduit or pipe is used. This minimizes expense and increases the ease of flexibility in design of conduit and changes to accommodate different processing situations.

There are many flatfish species such as sole and flounder that are not used for human food due to the shape of the fish making processing too expensive. The process describe here using water power can decrease the processing costs and make these fish available for market. The design of the alignment guides 44, knives 60, 60', and brushes 100 is very similar to those described above for the circular conduit 32. However, the shape of the conduit required to process flat fish is different. FIG. 7 illustrates the general shape of the conduit 32' required for flat fish.

Another modification of the process to adequately cut flat fish is inclusion of a second cutting section identical to the illustrated cutting section 32' positioned in the hydraulic flow after a turning section. The desired result is to have two sets of cuts in the flat fish at different angles giving a cross hatch type of cut. To do this a method to rotate the flat fish is needed between the first and second cutting sections.

FIG. 7a, illustrates a turning section 140 of conduit 32 which can be located between the first and second cutting sections for flat fish. The major cross-sectional axis would be aligned with the long cross section dimension of the cutting conduits 32. The changing height 142 between the long sides of the cutting conduit cause a variation in the velocity of water across this section. This differential velocity turns the flat fish and presents a different cutting path in the second cutting section. The length of the section 140 and the velocity of the fluid flow determine the degree of turning. The result is a cross hatch cut in the flat fish that increases separation of unwanted material and improves processing of fish for minced meat.

FIG. 7b illustrates another apparatus 140' to turn flatfish in the flow stream based on different velocity of flow across the conduit. The fluid flow near the outer radius 142 will be different from the fluid flow near the inner radius 144 due to the different volume of the flow path, length of flow path, and larger conduit surface area affecting the amount of turbulence in the flow path. This turning section could be constructed from conduit with a cross section like those shown in FIGS. 7a or 7b. The amount of rotation of an entrained particle, such as a flatfish in the flow stream, is dependent on the total degrees of inner and outer radius in the conduit 140'. This means that two turning sections with radii of 90 degrees each will have a similar effect as one turning section of 180 degrees as shown in FIG. 7b. Depending on different situations different turning sections with different radii could be combined. The turning sections could have bends or radii from 10 degrees to over 180 degrees. Forming the conduit into spirals or random three dimensional paths allow the use of more turns.

The concept behind the turning conduits shown in FIGS. 7a and 7b is changing the velocity of the flow stream across the cross section of the conduit. Another method for doing this is to increase the amount of fluid friction at the conduit wall surface by increasing the roughness of the wall. Referring to the flat shape of conduit shown in FIG. 7 without the knife blades added would give a conduit 32 a uniform velocity profile. If the wall surfaces on the right half were coated with 20 grit material while the left half remained smooth, the shear and turbulence would increase on the right side causing different flow velocity.

Figure 6:
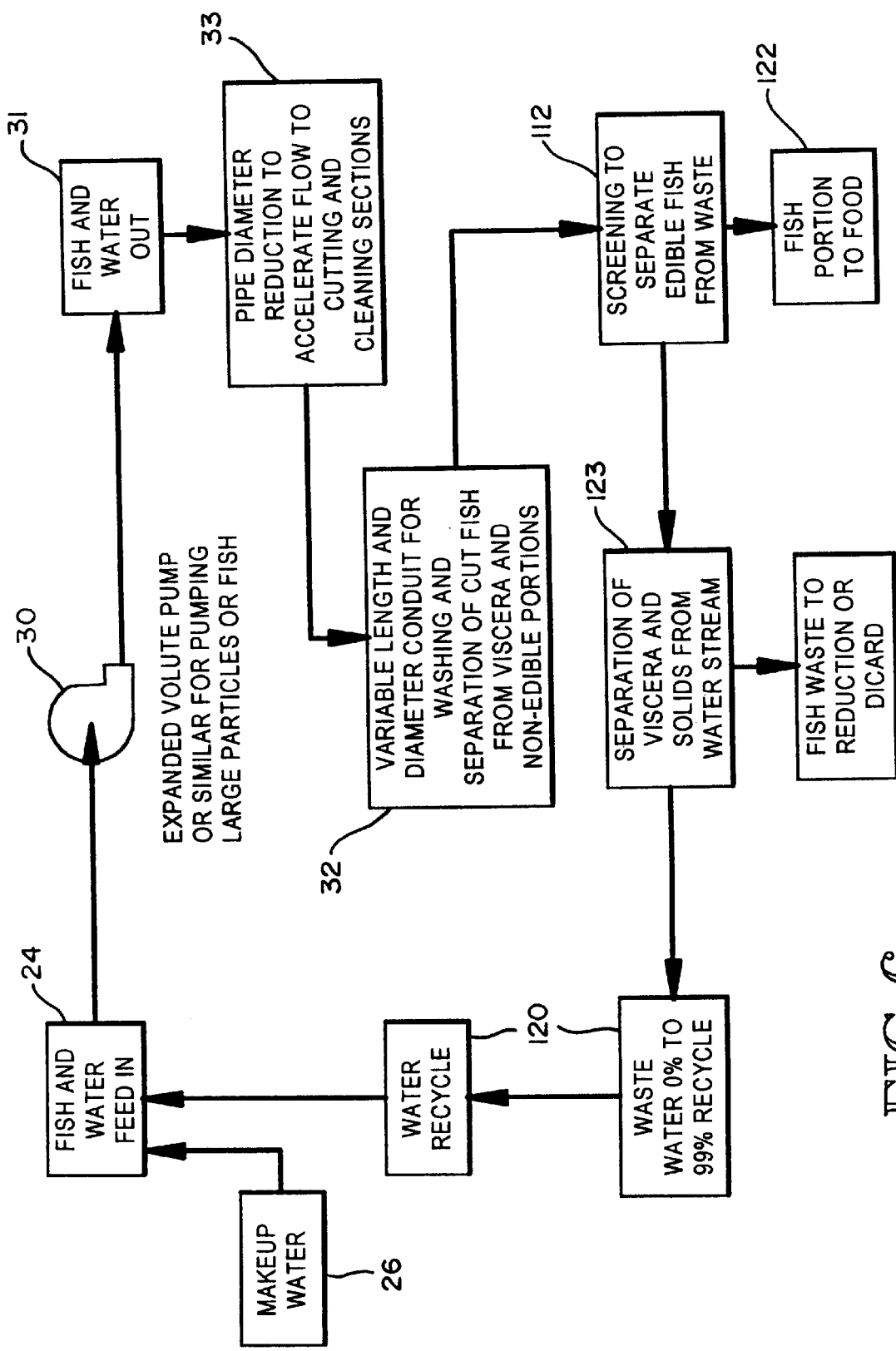
FIG. 6 is a schematic representation of the method steps employed in the invention.
Figure 10:
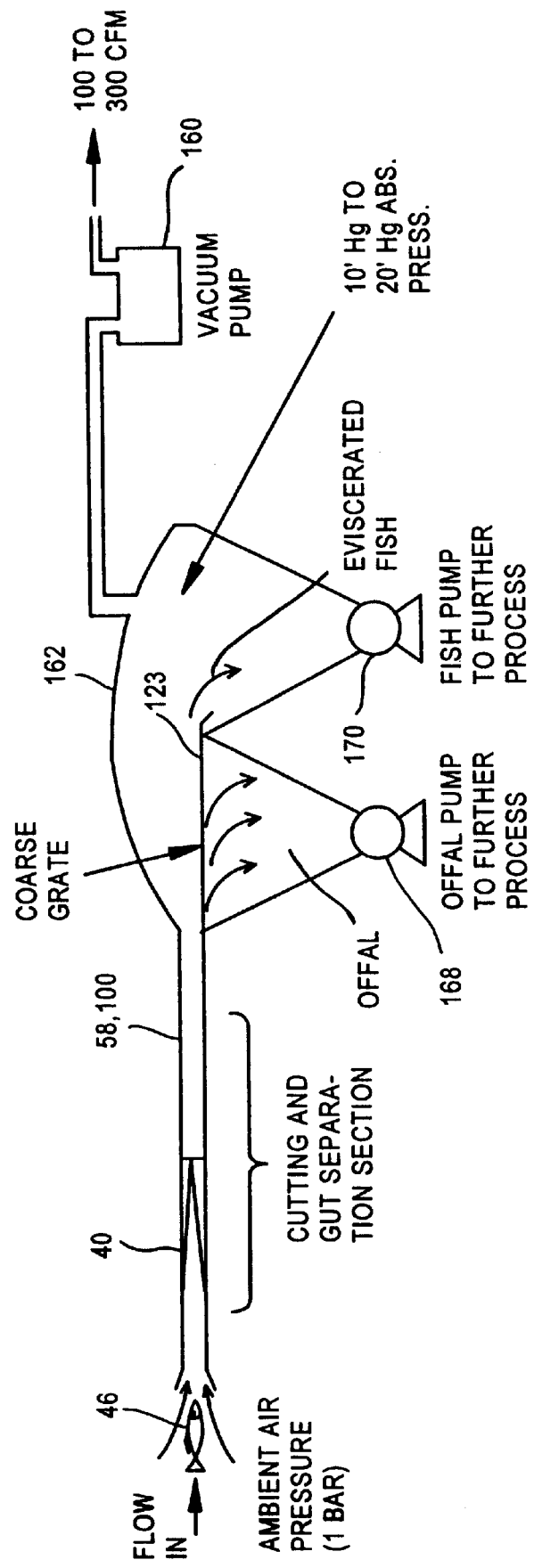
FIG. 10 is a schematic representation of an alternate embodiment of the invention employing gas pressure to move the fish.

As will be apparent to those of ordinary skill in the art, the inventive concepts described above may be applied to alternate embodiments of the invention. For example, the eviscerating section 100 may be provided with radially directed injectors 150 for injecting water, air or a mixture of water and air to provide additional turbulence in the fluid flow in that section, as best shown in FIG. 11, to provide enhanced evisceration of the fish 46. As shown in FIG. 10, the fluid flow may be in the form of air, or another gas, as the working fluid for propelling the fish. In the alternate embodiment of the invention shown in FIG. 10, a vacuum pump 160 provides a flow of 100 to 300 cubic feet per minute to a plenum 162 containing the screen 123 for separating the eviscerated fish from the viscera. Pumps 168, 170 remove the viscera and the eviscerated fish for further processing. In addition, a mixture of a fluid such as water and a gas such as air may be used as a motivating medium. FIG. 6 provides a schematic representation of the method used with respect to the apparatus described above in accordance with the principles of the invention and may be referred to by those of ordinary skill in the art in the construction of other alternate embodiments of the invention which are not disclosed herein.

PROCESSING EXAMPLE

Pilot tests were conducted in July of 1998. The pump used was a Cornell model #8NHPP. This pump has an 8 inch diameter suction and discharge. A rectangular tank with approximately 25 cubic feet of capacity was connected to the suction side of the pump to supply fish and water. The discharge from the pump was reduced down to 2.5" hose that connected to the accelerator section containing alignment guides and knives. During the trials different brush configurations were used after the cutting section. The conduit hose was arranged so that the discharge of all water and fish material was back into the tank after cutting and cleaning. A dividing screen in the tank separated fish and fish pieces from recycle water entering the pump on the other side of the screen.

With the pump running and water being pumped through the system and back to the tank, fish were placed in the tank near the suction intake and drawn into the pump. At pump discharge the fish traveled through the conduit and were cut, cleaned, and deposited back in the tank.

The fish used in the tests were mainly previously frozen mackerel and freshly caught Pacific Whiting that were held on ice. Batch sizes of fish used in the test runs varied from 4 fish to 100 fish per test run.

The size of the mackerel ranged from 220 grams to 500 grams. The size of the whiting ranged from 200 grams to 400 grams. The optimum fish size for these trials appeared to be in the 300 gram to 350 gram range. Satisfactory results were obtained with fish as small as 150 grams and up to 500 grams. The capacity of the pump and efficiency of this process was best demonstrated with larger batches of 50 fish or more. At a measured flow rate of 400 gallons per minute peak through put of fish was observed in the 300 to 400 fish per minute range. At this rate the ability to handle the volume feed fish and processed fish limited the duration of tests.

Yield was measured by weighing individual fish before and after small batch runs. For large batches the number of fish and overall weight was used to determine an average fish weight. Yield as wt./wt. varied from 69% to 90%. The lower yields were always associated with small batch fish. The very small amount of feed allowed the fish to circulate in the pump impeller for up to 20 seconds before being discharged. This caused mechanical damage and breakage of the fish resulting in lower yield. Evisceration and cutting were satisfactory as determined by low or non-existent amount of attached viscera. The best yield and visible quality were from the larger batches of fish that allowed a steady and large enough feed stream in a short period to allow quick and even flow of fish through the pump and system. The fish with the highest yield retained most of the head parts and some viscera in most cases. Some of the yield can be attributed to increased moisture in the flesh from exposure of more surface area and varying amount of mixing and contact time in the process stream and water tank. Many of the fish in the large batches processed very well based on very low levels of attached viscera. These fish had yields that ranged from 78% to 84%. Since the viscera from these fish account for 15% to 25% of body mass, depending on the season, the results indicate maximum eviscerated yield. Using an estimated 70% recovery of minced flesh from an eviscerated fish that is 80% of original weight would provide a final minced flesh yield of 56% from round fish. Mince yield from small fish using conventional machinery is 30% to 32%. This process has the potential to nearly double the amount of edible flesh from small fish.

One person was required to run the pilot tests. This involved turning the pump on, putting fish in the tank, and turning the pump off. One operator is required at all times in the event of mechanical failure or process upset.

In view of the above, the invention is not to be limited by the above disclosure, but is to be determined in the scope by the claims which follow.

I claim:

1. A hydrodynamic partial decortication apparatus for evisceration of fish, comprising:
   hydraulic means for propelling fish in a hydraulic flow;
   an elongated hydraulic guide conduit having an inlet connected to the hydraulic means for serially transporting and centering individual fish within the hydraulic flow;
   a hydraulic cutting conduit having an inlet connected to an outlet of the guide conduit, the cutting conduit having a plurality of elongated longitudinally oriented, radially directed blades each having one end adjacent to the inlet being pivotally connected to the cutting conduit and a distal free end removed from the inlet, the free end being inwardly biased and protruding into the hydraulic flow more so than the pivotally connected end, wherein adjacent cutting edges of the blades are separated at least by a minimum gap distance so that the fish passing through the cutting conduit are strip flayed to expose viscera of the fish; and, an eviscerating conduit having an inlet connected to an outlet of the cutting conduit, the eviscerating conduit having a plurality of inwardly directed projections for snagging the exposed viscera from the flayed fish and entraining the viscera in the hydraulic flow substantially separated from the flayed fish.

2. The apparatus of claim 1, including hydraulic separation means for separating the entrained viscera from the flayed fish and the hydraulic flow.

3. The apparatus of claim 1, wherein the cutting conduit is an enclosed tube having a cross sectional area approximately equal to a maximum cross sectional area of the fish.

4. The apparatus of claim 1, wherein the hydraulic means is a pump and the hydraulic flow includes water.

5. The apparatus of claim 1, wherein the blades are tapered from the inlet adjacent end to the outlet adjacent end and wherein the minimum gap distance is in the range of at least 2 mm to 3 mm.

6. The apparatus of claim 1, wherein the conduits are substantially cylindrical in cross section and wherein the cutting conduit has six blades equiangularlly spaced thereabout which protrude into the cutting conduit through elongated slots therein and wherein the slots are hydraulically sealed with respect to the cutting conduit by a circumferential coaxial hydraulic casing having clearance for radial movement of the blades.

7. The apparatus of claim 1, wherein the free end of each blade is inwardly biased by an inflatable, resilient torus in the hydraulic casing.

8. The apparatus of claim 1, wherein the inflatable, resilient torus has tensile loops attached to the torus and to the free ends of the blades so that deflation of the torus separates the blade free ends thereby opening the cutting conduit.

9. The apparatus of claim 1, wherein the guide conduit includes a plurality of elongated, flexible guide rods having fixed ends adjacent to the guide conduit inlet and free ends extending into the hydraulic flow adjacent to the guide conduit outlet.

10. The apparatus of claim 1, wherein the conduits are assembled so as to have a predetermined length and cross-sectional area and wherein the hydraulic means operates at a preselected gage pressure so that the hydraulic flow is in the range of at least 250 to 400 Gallons per minute.

11. A hydrodynamic flaying apparatus for eviscerating fish, comprising:

hydraulic pressure generating means for propelling fish in a hydraulic flow;

a hydraulic cutting section fluidly connected to the pressure generating means, the cutting section having a plurality of longitudinally oriented, radially directed blades each being inwardly biased and protruding into the hydraulic flow, wherein adjacent cutting edges of the blades are separated at least by a minimum gap distance so that the fish passing through the cutting section are strip flayed to expose viscera of the fish; and, an eviscerating section fluidly connected to the cutting section, the eviscerating section having a plurality of inwardly directed brushes for snagging the exposed viscera from the flayed fish and entraining the viscera in the hydraulic flow substantially separated from the flayed fish.

12. The apparatus of claim 11, including an elongated hydraulic guide conduit having an inlet fluidly connected to the pressure generating means and an outlet fluidly connected to the cutting section for serially transporting individual fish from the pressure generating means to the cutting section within the hydraulic flow, wherein the guide conduit includes a plurality of elongated, flexible guide rods having fixed ends adjacent to the guide conduit inlet and free ends extending into the hydraulic flow adjacent to the guide conduit outlet for centering and aligning the fish with a longitudinal axis defined by the conduit.

13. The apparatus of claim 11, wherein the eviscerating section is substantially cylindrical and has approximately twenty five 1.5" long randomly positioned brushes per linear foot of eviscerating section.

14. The apparatus of claim 11, wherein the hydraulic flow has water.

15. The apparatus of claim 11, wherein the blades are elongated and have radially directed cutting surfaces, each blade having one end adjacent to the inlet being pivotally connected to the cutting section and a distal free end removed from the inlet, the free end being inwardly biased and protruding into the hydraulic flow more so than the pivotally connected end, the blades being tapered from the inlet adjacent end to the outlet adjacent end and wherein the minimum gap distance is in the range of 2 mm to 3 mm.

16. The apparatus of claim 11, wherein the conduits and sections are substantially cylindrical in cross section and wherein the cutting section has six elongated blades equiangularlly spaced thereabout which protrude into the cutting section through elongated slots therein and wherein the slots are hydraulically sealed with respect to the cutting section by a circumferential coaxial hydraulic casing having clearance for radial movement of the blades.

17. The apparatus of claim 15, wherein the blades have a pivoted end adjacent the cutting section and a free end extending into the hydraulic flow, the free end of each blade being inwardly biased by an inflatable, resilient torus in the hydraulic casing.

18. The apparatus of claim 17, wherein the inflatable, resilient torus has tensile loops attached to the torus and to the free ends of the blades so that deflation of the torus separates the blade free end opening the cutting section.

19. The apparatus of claim 1, wherein the conduits and sections are substantially tubular and have an average radius of approximately 2.5" and a combined length of approximately 57 feet.

20. The apparatus of claim 19, wherein the pressure generating means is a pump and the pump operates at a preselected gage pressure so that the hydraulic flow is in the range of 250 to 1000 Gallons per minute.

21. A hydrodynamic fish flaying apparatus, comprising:

an elongated tubular conduit having an inlet and an outlet and defining a plurality of longitudinal slots;

a plurality of elongated longitudinally oriented blades directed normal to an interior surface of the conduit, each blade protruding into the cutting conduit through the elongated slots and having one end adjacent to the inlet being pivotally connected to the cutting section and a distal free end adjacent to the outlet, the free end being inwardly biased and protruding into a hydraulic flow more so than the pivotally connected end, wherein adjacent cutting edges of the blades are separated at least by a minimum gap distance so that the fish passing through the cutting section are strip flayed to expose viscera of the fish; and, wherein the slots in the cutting conduit are hydraulically sealed with respect to the cutting conduit by a circumferential coaxial hydraulic casing having clearance for transverse movement of the blades.

22. A method for partially eviscerating fish, comprising the steps of:

propelling a quantity of fish through a conduit with a hydraulic fluid by means of hydraulic pressure;

longitudinally and radially aligning the fish in series in the conduit;

strip flaying the fish in the conduit with a plurality of cutting blades to expose viscera of the fish without separating strips of fish flesh from the fish; and eviscerating the fish by snagging the exposed viscera from the flayed fish in the conduit and entraining the viscera in the hydraulic flow substantially separated from the flayed fish.

23. The method of claim 22, including separating the entrained viscera from the hydraulic flow.

24. The method of claim 23, wherein the hydraulic fluid is water.

25. The method of claim 24, wherein a mixture of fish and water supplied to the conduit is in a ration of at least one part fish to ten parts water by volume.

* * * * *

UNITED STATES PATENT AND TRADEMARK OFFICE
CERTIFICATE OF CORRECTION

PATENT NO : 6,129,624
DATED : October 10, 2000
INVENTOR(S): Peter Nicklason

It is certified that error appears in the above-identified patent and that said Letters Patent are hereby corrected as shown below:

Page 1, column 1, line 4: Peter Niklason should be replaced with "Peter Nicklason".

Signed and Sealed this

Twenty-fourth Day of April, 2001

Attest:

NICHOLAS P. GODICI

Attesting Officer

Acting Director of the United States Patent and Trademark Office